Sept. 23, 1969     R. D. HOUK     3,468,185
CONTROL FOR PROVIDING LONG TRAVEL TO THE
CORE OF A PUSH-PULL CABLE
Filed July 18, 1967
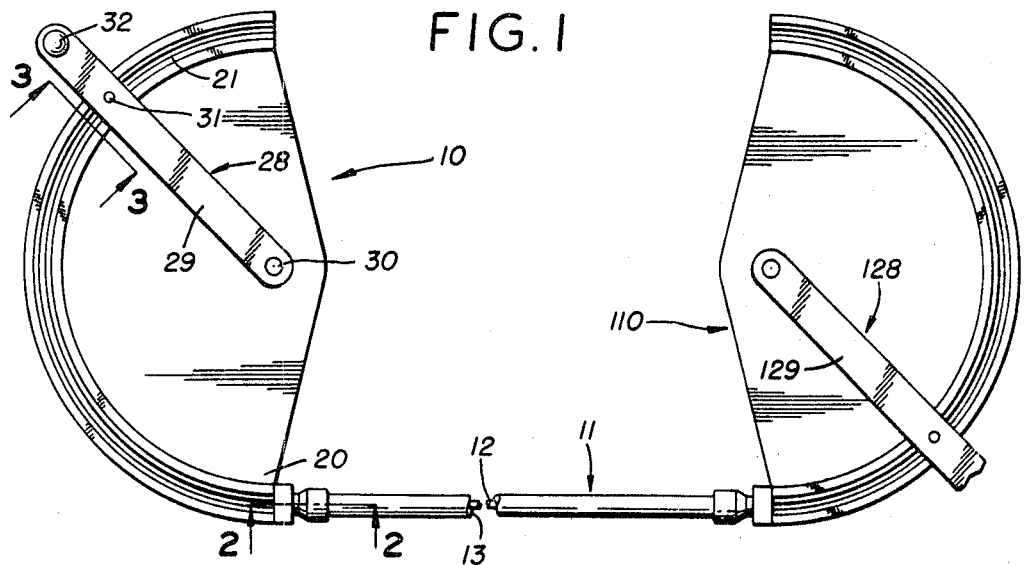
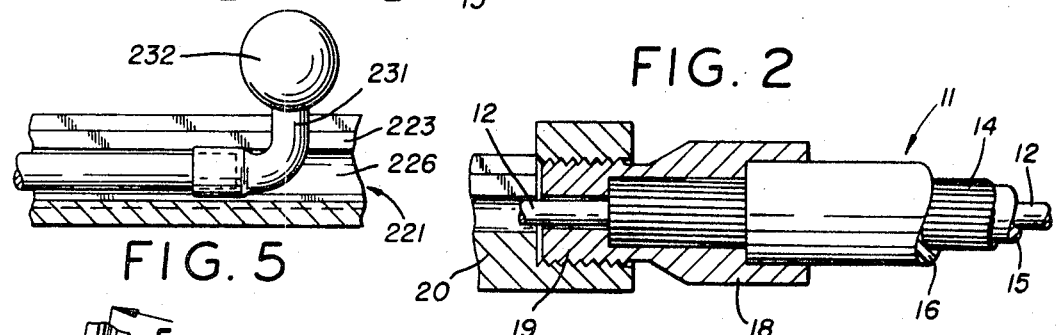
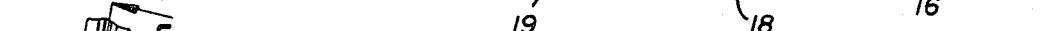
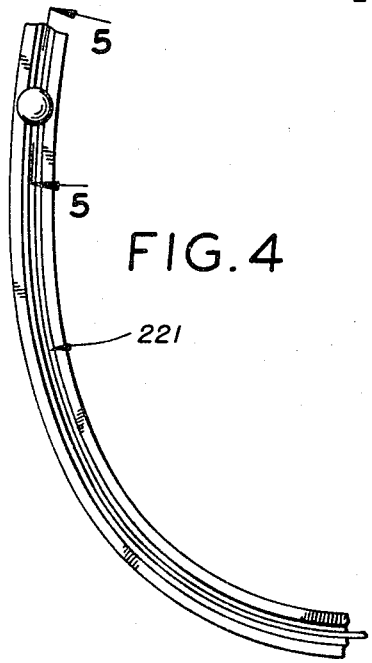
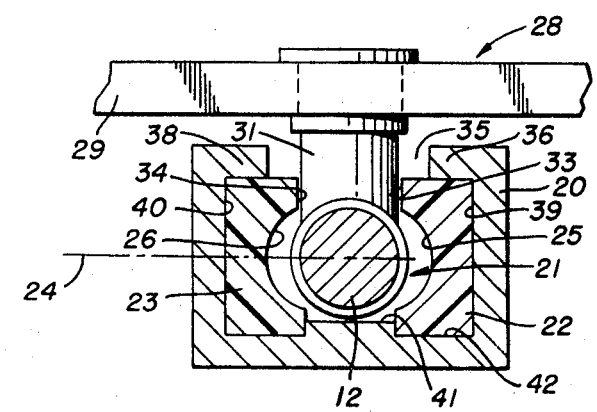
INVENTOR.
RICHARD D. HOUK
BY *Hamilton & Cook*
ATTORNEYS

United States Patent Office 3,468,185
Patented Sept. 23, 1969

3,468,185
CONTROL FOR PROVIDING LONG TRAVEL TO THE CORE OF A PUSH-PULL CABLE
Richard D. Houk, Stow, Ohio, assignor, by mesne assignments, to North American Rockwell Corporation, Pittsburgh, Pa., a corporation of Delaware
Filed July 18, 1967, Ser. No. 654,183
U.S. Cl. F16c 1/20
U.S. Cl. 74—501                                       4 Claims

ABSTRACT OF THE DISCLOSURE

A control for a push-pull cable. The housing of the control is provided with a curvilinear guide slot in which the core of the push-pull cable is received. A pair of opposed tracking grooves, which lie within the plane of the curve formed by the guide slot, are presented within the guide slot. A handle means is attached to the end of the core laterally of the tracking grooves, and guide slot, for selectively reciprocating it along the guide slot. The tracking grooves are preferably provided in low friction core guides rigidly supported within the guide slot. By using one such device as a control station and connecting it, through a push-pull cable, to a second such device at a remote controlled station, a system capable of utilizing considerable core displacement is provided.

BACKGROUND OF THE INVENTION

The advent of push-pull control cables provided a structure for effecting remote control by the application of either tensile or compressive forces. This itself was a great advance over the historic "balanced" systems in which the control cables formed a closed circuit so that motion in two directions could be relayed, but always by tensile forces. An example of a "balanced" control system is shown in U.S. Patent No. 2,737,822, to John F. Morse.

Initially, the use of push-pull control cables was limited to light load applications. However, with the more recent developments in far stronger cable casings, the use of push-pull cables has expanded until today they are employed in widely diversified fields for mechanically transmitting forces of hundreds and even thousands of pounds.

One of the most severe restrictions in the use of push-pull cables has been the limited extent to which the core may be axially translated beyond the end of the casing in which it is received without the use of complex and expensive controls. Most commercially available controls have inherent limitations which prevent their usefulness for installations which require an axial translation of the core of much in excess of approximately three inches. When the core is unsupported for any appreciable length, its ability to transmit compressive forces declines markedly, with buckling of the core being symptomatic of attempted core translation in excess of the ability of the control to which the cable is attached.

SUMMARY OF THE INVENTION

It is therefore a primary object of the present invention to provide a control for a push-pull cable capable of imparting exceptionally long travel to the core even under heavy compressive loading.

It is another object of the present invention to provide a control, as above, which eliminates buckling of the core and minimizes backlash.

It is a further object of the present invention to provide a control, as above, which is relatively uncomplicated and is inexpensive to manufacture and maintain.

It is a still further object of the present invention to provide a system of motion transmission utilizing two controls, as above, connected by a length of push-pull cable for full utilization of the long travel available from such a control.

These and other objects which will become apparent from the following specification are accomplished by means hereinafter described and claimed.

A control according to the concept of the present invention is generally constructed upon a housing, or frame, in which a curvilinear guide slot is provided. The casing of the push-pull cable is secured to the housing, and the core is slidably received within the guide slot. A core guide is provided along the radially inner and radially outer sides of the guide slot with tracking grooves therein for bearing support of the core. A handle means is provided for attachment to the core so that it may be selectively translated within the groove.

Two alternative embodiments of the present invention are shown by way of example in the accompanying drawings and hereinafter described and claimed in detail without attempting to show all of the various forms and modifications in which the invention might be embodied; the invention being measured by the appended claims and not by the details of the specification.

DESCRIPTION OF THE DRAWINGS

FIG. 1 is a schematic representation of a push-pull cable operated by a control embodying the concept of the present invention and connected to a remote controlled station of similar construction to depict a system for the utilization of long core travel;

FIG. 2 is an enlarged cross section taken substantially on line 2—2 of FIG. 1;

FIG. 3 is an enlarged cross section taken substantially on line 3—3 of FIG. 1;

FIG. 4 is a view similar to a partial area of FIG. 1 depicting an alternative embodiment of a control according to the present invention; and, FIG. 5 is an enlarged cross section taken substantially on line 5—5 of FIG. 4.

DETAILED DESCRIPTION OF A PREFERRED EMBODIMENT

Referring particularly to the drawings, the subject control, indicated generally by the numeral 10, is operatively connected to a push-pull control cable 11. A push-pull control cable 11 includes the core 12 and a casing 13 in which the core 11 slidably reciprocates.

The prior art knows many casing constructions, one of which is depicted environmentally herein and comprises a plurality of wires 14 contiguously laid in the form of a helical coil about the radially outer surface of an inner, flexible tube 15 which extends the full length of the casing 13. An outer, flexible cover 16 encases the coil of wires 14 and extends along the entire casing to generally within a short distance from the end of the wires 14.

A fitting 18 is positioned over the end of the wires 14 and cover 16 and securely attached thereto, as by swaging. A threaded portion 19 on the end of the fitting 18 provides one means of anchoring the end of the casing into the housing 20 of the improved control 10.

A guide slot 21 in the housing 20 is aligned with the casing 13 at the point where the casing is attached to the housing and receives the core 12 slidable therein. The guide slot 21 extends curvilinearly away from the fitting 18 and is fitted with a pair of opposed core guides 22 and 23 on the radially inner and outer side of the curvilinear guide slots 21, respectively. That is, the core guides lie in the plane 24 of the curve defined by the guide slot 21.

As best shown in FIG. 3, the core guides 22 and 23 are preferably provided with opposed tracking grooves 25 and 26, respectively. The core guides are rigidly supported within the guide slot 21, and a handle means 28 is secured to the core 12 for imparting movement thereto. As shown in FIGS. 1 and 3 the handle means may comprise a lever 29 pivotally mounted on stub shaft 30 located at the center of curvature of the slot 21 if the guide slot 21 is arcuate. The core 12 may then be bent at right angles, or, as shown, attached to a right angled link 31 which cooperatively engages the lever 29. A handle 32 may be provided on lever 29 for manual actuation of the core. Equally as effective, the lever 29 may be nonrotatably secured to the shaft 30 and the shaft 30 may be rotatably journaled in the housing 20. With this arrangement a wheel, or other mechanism, may be supplied to rotate the shaft 30 and thus occasion actual translation of the core 12.

To complete a system for remote control affording relatively long core displacements, a similar control 110, constituting a controlled station, may be provided at the end of the cable 11 remote from the control 10. This remote controlled station may be constructed identically with the control 10, except that instead of the handle means 28 comprising an input drive means, the lever 129 and any means for attachment thereto comprise an output driven means 128.

An alternative control construction is shown in FIGS. 4 and 5. In that construction a handle 232 is attached directly to the core, or link 231. With this arrangement the guide slot 221 need not be arcuate (FIG. 4) or may be of an arc of such large radius that it would be impractical to mount a lever 29 from the center of curvature.

In any event, so long as the slot 221 is curvilinear, when a force imparting a tensile stress is applied to the core it will slide along the tracking groove in the core guide (not shown) located on the radially inner side of the curved guide slot 221. Conversely, when a force imparting a compressive stress is applied to the core it will slide along the tracking groove 226 in the core guide 223 located on the radially outer side of the curved guide slot 221. As such, it is highly desirable that the core guides impose as little frictional resistance as possible to the movement of the core therealong. While the core guides may be integral with the housing for some installations, by and large it is generally more desirable to utilize a self-lubricating material, or a material of low frictional resistance. Plastic materials such as polyethylene or nylon work quite well for this as do some of the acetyl resins.

Reverting again to FIGS. 1–3, because the core will be captivated into either tracking groove 25 or tracking groove 26, depending on the direction it is moving, the core guides may be spaced apart at least on one side thereof a distance sufficient to permit the link 31 to pass transversely therebetween. As shown in FIG. 3, the link 31 extends transversely of guide slot plane 24 outwardly between the opposed faces 33 and 34 of the core guides 22 and 23, respectively.

The depth of tracking grooves 25 and 26 necessary to captivate the core need not be excessive as that only accentuates the amount of backlash. It has been found that if the tracking grooves are of a depth no greater than one-third the core diameter, even then heaviest loads may be assumed by the core under normal operating conditions without lateral buckling. Of course, for installations in which only very light loads will be encountered, the depth may be decreased for commensurate decrease in the amount of blacklash.

It is because the tracking grooves provide the sole means for captivating the core that the core guides must, as stated above, be rigidly supported in the housing. A simple but highly successful way in which to fix the core guides in the housing 20 is to use a mechanical interlock, as shown. The guide slot 21 is generally rectilinear with the width thereof being somewhat wider than the opening 35. This is accomplished by having opposingly directed lips 36 and 38 extend beyond the side walls 39 and 40 of the guide slot 21 to define the opening 35. Aligned with the opening 35, a divider ridge 41 extends outwardly from the back wall 42. This construction forms a pair of cavities into which the core guides can be closely fited and which rigidly supports the guides against not only movement in the plane 24 of the curved slot 21 but also laterally with respect thereto.

A device constructed according to the concept of the present invention therefore provides a control for push-pull cables which affords not only considerable axial translation of the core but also accommodates a wide range of loads. Moreover, a pair of such controls remotely positioned and interconnected by a push-pull cable provides an inexpensive system for achieving relatively long core translation.

I claim:

1. A control for the core of a push-pull cable having a casing with the core slidably received therein, said control having a housing with a guide slot, said guide slot being of curvilinear configuration, opposed tracking grooves presented within said guide slot along the inner and outer sides of said curvilinear configuration, the core being slidably received in the tracking groove on the inner side of said curvilinear configuration when said core is being pulled with respect to the casing and the core being slidably received in the tracking groove on the outer side of said curvilinear configuration when said core is being pushed with respect to said casing, handle means connected to said core laterally of said tracking groove for imparting pushing or pulling movement to the core with respect to said casing.

2. A control, as set forth in claim 1, in which the tracking grooves are provided by core guides rigidly supported in said guide slot.

3. A control, as set forth in claim 1, in which the curvilinear configuration of said guide slot lies within a single plane and in which the tracking grooves are provided by core guides rigidly supported in said guide slot, the depth of said tracking grooves being no greater than one-third the diameter of said core.

4. A system for the transmission of mechanical motion comprising a push-pull cable having a casing with a core slidable therein, a control station at one end of said core and a controlled station at the other, said control and controlled stations each having a housing with a guide slot therein, the ends of the cable casing attached, respectively, to the housing of said control and controlled stations in alignment with the guide slot in each, both said guide slots being of curvilinear configuration, a pair of opposed tracking grooves in each guide slot, the respective ends of the cable core slidably received in said tracking grooves, input drive means connected to said core laterally of said tracking groove in said controlled station and output driven means connected to said core laterally of said tracking grooves in said controlled station.

(References on following page)

References Cited

UNITED STATES PATENTS

| | | |
|---|---|---|
| 2,246,086 | 6/1941 | Austin. |
| 2,737,822 | 3/1956 | Morse _____ 74—501 X |
| 2,814,538 | 11/1957 | Connolly. |
| 1,589,108 | 6/1926 | Caretta _____ 74—501 |
| 1,590,817 | 6/1926 | Fillettaz _____ 74—501 |
| 2,821,092 | 1/1958 | Cordora et al. _____ 74—501 |
| 3,135,130 | 6/1964 | Bentley. |
| 3,217,557 | 11/1965 | Martinot. |

FOREIGN PATENTS

| | | |
|---|---|---|
| 437,109 | 10/1935 | Great Britain. |
| 625,181 | 4/1927 | France. |
| 678,371 | 7/1937 | Germany. |

FRED C. MATTERN, Jr., Primary Examiner

C. F. GREEN, Assistant Examiner

U.S. Cl. X.R.

74—502